United States Patent [19]

Nebesh et al.

[11] Patent Number: 4,900,711
[45] Date of Patent: Feb. 13, 1990

[54] HYDROTREATING CATALYST

[75] Inventors: Eugene Nebesh, Parma; Robert A. Plundo, Hudson; Steven L. McMahon, Macedonia, all of Ohio

[73] Assignee: Harshaw/Filtrol Partnership, Cleveland, Ohio

[21] Appl. No.: 172,267

[22] Filed: Mar. 23, 1988

[51] Int. Cl.$^4$ .................. B01J 21/12; B01J 27/02; B01J 27/08
[52] U.S. Cl. .................. 502/228; 502/221; 502/229; 502/254; 502/258; 502/263
[58] Field of Search .............. 502/228, 229, 221, 238, 502/255, 263; 208/145, 115

[56] References Cited

U.S. PATENT DOCUMENTS

| | | | |
|---|---|---|---|
| 2,760,907 | 8/1956 | Attane, Jr. et al. | 502/228 |
| 2,849,382 | 8/1958 | Hiachler | 502/228 |
| 3,046,218 | 7/1962 | Henke et al. | 208/109 |
| 3,062,735 | 11/1962 | Donaldson et al. | 208/115 |
| 3,078,238 | 2/1963 | Beuther et al. | 252/439 |
| 3,182,012 | 5/1965 | Browning et al. | 502/255 |
| 3,193,349 | 7/1965 | Mooi | 502/228 |
| 3,329,603 | 7/1967 | Hughes et al. | 502/228 |
| 3,425,934 | 2/1969 | Jacobson et al. | 502/255 |
| 3,493,493 | 2/1970 | Henke et al. | 208/264 |
| 3,524,808 | 8/1970 | Quik et al. | 502/228 |
| 3,531,398 | 9/1970 | Adams et al. | 502/255 |
| 3,553,107 | 1/1971 | Donaldson et al. | 208/271 |
| 3,560,370 | 2/1971 | Billon et al. | 502/238 |
| 3,673,112 | 6/1972 | Levinson | 502/228 |
| 4,046,714 | 9/1977 | O'Hara | 502/255 |
| 4,427,534 | 1/1984 | Brunn et al. | 208/89 |

FOREIGN PATENT DOCUMENTS

| | | |
|---|---|---|
| 2447303 | 4/1975 | Fed. Rep. of Germany . |
| 2748034 | 5/1978 | Fed. Rep. of Germany . |
| 207464 | 2/1984 | Fed. Rep. of Germany . |
| 1468160 | 4/1974 | United Kingdom . |
| 1408759 | 10/1975 | United Kingdom . |
| 1560036 | 1/1980 | United Kingdom . |

*Primary Examiner*—Carl F. Dees
*Attorney, Agent, or Firm*—Renner, Otto, Boisselle & Sklar

[57] ABSTRACT

A hydrotreating catalyst is described which comprises at least one Group VI metal, metal oxide, or metal sulfide, at least one Group VIII metal, metal oxide, or metal sulfide, and a halogen supported on a carrier wherein (A) the catalyst comprises from about 10% to about 35% by weight of combined metal and the atomic ratio of the Group VIII metal to Group VI metal is in the range of from about 0.5:1 to about 2:1;

(B) the catalyst contains from about 0.5 to about 10% by weight of halogen;

(C) the carrier comprises from about 10 to about 50% by weight of silica and from about 40 to about 90% of alumina; and (D) the catalyst is characterized as having a median pore radius of from about 20 to about 90 Angstroms, and a surface area of from about 90 to about 230 m$^2$/g.

The catalyst is useful in the production of lubricating oils from crude lubricating oil stocks. Hydrotreating processes using the catalysts of the invention result in the production of oils having increased viscosity indexes, reduced aromatic content and improved stability. The nitrogen and sulfur content of the oils also are reduced through the use of the catalyst in the hydrogenation process.

41 Claims, 1 Drawing Sheet

HYDROTREATING CATALYST

TECHNICAL FIELD

This invention relates to hydrotreating catalysts, their preparation, and their use in hydrotreating hydrocarbon oils to improve the viscosity index and other properties of the oils and/or to reduce the aromatic content of the oils. More particularly, this invention relates to hydrotreating catalysts having unusual and improved characteristics, and the use of such catalysts for upgrading hydrocarbon oil charge stocks.

BACKGROUND OF THE INVENTION

Viscosity index, light stability, aromatics content and iodine number are measurements which are employed in lubricating oil specifications as general indicators of the quality of the oil. Viscosity index is a reflection of an oil's resistance to viscosity change with fluctuations in temperature. The higher the viscosity index of an oil, the more resistant it is to a viscosity change caused by temperature fluctuation. Iodine number is an indicator of the amount of unsaturated linkages appearing in the molecules present in the oil to which iodine can be added. Unsaturated linkages generally are undesirable because such linkages are more readily oxidized than saturated linkages, especially at elevated temperatures, and such oxidation results in degradation of the oil. Therefore, a high quality lubricating oil, i.e., one that is particularly desirable for automotive uses, should possess a relatively high viscosity index and a relatively low iodine number.

The stability of oils also is affected by the presence of aromatic materials in the oil. The aromatic content of oils can be reduced by hydrotreating or hydrocracking. Hydrotreating processes are preferred where it is desired to reduce aromatics without significantly increasing the amount of undesirable low boiling materials. Hydrotreating processes can be effective for the saturation of aromatic compounds to naphthenic materials without significant cracking or hydrocracking.

The upgrading of crude lubricating oil stocks by means of catalytic hydrogenation has been suggested in the art. Generally, the processes require, in a first stage, the treatment of the crude lubricating oil stocks with hydrogen under conditions of elevated temperature and pressure while employing a catalyst comprising hydrogenating components (metals) supported on a carrier having a substantial degree of cracking activity such as for example, alumina, silica, and mixtures thereof. Although many of the catalysts which have been suggested in the prior art provide some improvement, there continues to be a need for improved multifunctional catalysts which provide increased yields, higher viscosity indexes and reduced aromatics content under lower reaction temperatures The acidic or cracking function in the hydrotreating process usually is supplied by the catalyst support or the catalyst support enhanced by acidic promoters such as halogens. The hydrogenation activity of a supported catalyst is supplied by the hydrogenation metal component which may exist in the final catalyst as a metal, the metal ion complexed with the support structure and other promoters, or metal compounds, notably the oxides and sulfides. Typical hydrogenation metals are metals of Groups VIB and VIII of the Periodic Table of Elements.

The hydrogenation catalysts which are useful in hydrotreating crude oils generally serve a multiplicity of functions such as cracking, nitrogen removal, sulfur removal, metal removal, hydrogenation, etc. Various catalysts which have been suggested in the prior art will perform these functions to different degrees, and catalyst compositions have been designed and formulated to optimize their performance with respect to one or more of such functions. For example, catalysts have been suggested which are extremely useful in increasing the viscosity index and reducing nitrogen and sulfur content, but the same catalysts are not very effective for reducing the aromatic content of the oil. Other catalysts have been designed to provide a minimum cracking of the oil and an increase in effectiveness in removing aromatics. These are normally used in the second stage of a two-stage process after the viscosity index has been increased and nitrogen and sulfur content reduced by use of a specially designed hydrotreating catalyst. Although such procedures are effective in producing the desired result, the processes do require the use of two different catalysts thereby requiring the maintenance of inventories of two different catalysts.

The physical properties of the catalysts useful in the hydrogenation reactions, in some instances, may be as important as the catalytic activity. To be useful, the catalyst must have sufficient mechanical strength to resist crushing and/or attrition in use. Since catalytic reactions generally occur at the surface of the catalyst, it is considered desirable that the catalyst have optimal surface area and pore volume. Thus, in the preparation of the catalysts, it is important to use supports of high surface areas and pore volumes because impregnation of a support with metals fills the pores and reduces the surface area.

Because of the continuing demands placed on the lubricating oil producers for improved products, the producers typically use two or more hydrotreating stages. A catalyst generally is selected for the first stage for its ability to hydrocrack the crude feedstock which typically is a vacuum gas oil. In the second and subsequent stages, a catalyst is chosen which is capable of polishing the oil with the occurrence of mild hydrogenation and aromatics removal. In general, cracking, (i.e., formation of lower boiling materials) is undesirable in the second stage.

Numerous publications, including patents, have discussed the catalytic hydrogenation of lubricating oil stocks. U.S. Pat. Nos. 3,078,238 and 3,046,218 describe a supported nickel-tungsten catalyst which has been treated with a halogen such as fluorine to improve the hydrogenation activity of the catalyst. The resultant catalyst contains at least 0.3% fluorine, and preferably 2.5% or more of fluorine. The catalyst support is preferably a mixture of alumina and silica. In the '238 patent, the catalyst composition comprises halogenated, sulfided supported nickel and tungsten wherein the carrier material possesses cracking activity The amount of nickel and tungsten present in the catalyst should be a total of from 5% to about 40% of the total catalyst weight, and the nickel and tungsten are present in some form of combination or mixture with sulfur. The sulfur should be present in amounts of from about 2% to about 23% of the catalyst weight. The support materials are composites of silica and alumina and the materials may contain between 1% and 99% silica although compositions containing from 5% to 90% silica are more desirable, and the most desirable composites contain 65% to 90% silica. In U.S. Pat. No. 3,046,218, the catalyst support may be natural or synthetic high silica-low alumina catalyst or silica-alumina cracking catalyst which contain up to 50% alumina.

In Table I of U.S. Pat. No. 3,078,238, various catalysts containing various support compositions are identified containing various silica to alumina ratios including a catalyst support containing 5% silica and 95% alumina. This latter catalyst is reported to have a low cracking value resulting in a lube oil product having an undesirable high iodine number and a relatively low viscosity index which is about the same as the catalyst wherein the support composition is over 99.5% by weight of alumina. Based upon the results reported in the '238 patent, the patentees concluded that the catalyst should preferably have a cracking activity on the Kellogg scale of between 60 and 80 and that the support should be high-silica support comprising from 75–85% silica and from 25% to 15% alumina.

U.S. Pat. No. 3,553,107 discloses a hydrotreating catalyst and a process for treating lubricating oil stock containing from 5% to 30% aromatics by volume whereby the aromatic content of the oil is significantly reduced. The oil then is treated with fuming sulfuric acid, neutralized with caustic, and extracted with alcohol to remove sulfonates and yield a white oil. The hydrotreating catalyst used to reduce the aromatic content in the lubricating oil stock employs Group VI and Group VIII metals on an alumina support. Preferred catalysts include combinations of nickel and tungsten in amounts of from 10% to about 30% by weight and preferably about 25%. In another preferred embodiment, the catalyst is composed of 20% nickel, 20% tungsten and 2% fluorine on alumina.

U.S. Pat. No. 3,493,493 describes hydrotreating catalysts useful for enhancing lubricating oils. The catalysts comprise at least one Group VI metal and one Group VIII metal on an alumina carrier having a cracking activity index of less than about 30 and containing halogen. The total metals content of the catalysts is at least 20% by weight, and the atomic ratio of Group VIII metals to Group VI metals is in the range of from about 2.25:1 to about 6:1. The carrier employed in the invention must be alumina which has low activity for the promotion of cracking. The effectiveness of the catalysts claimed in this patent is compared to catalysts using different supports containing mixtures of alumina and silica including supports comprising 75% silica and about 25% alumina.

U.S. Pat. No. 4,427,534 describes the process for the production of a jet or diesel fuel from aromatics-containing feedstock. The process comprises contacting hydrogen and a feedstock with a presulfurized catalyst composite comprising a Group VIB metal, a Group VIII metal and a halogen impregnated on a cracking support under hydrogenation/hydrocracking conditions. The preferred carrier is a silica-alumina composite containing from about 65% to about 85% silica, preferably about 70–80% silica and 20–30% alumina.

SUMMARY OF THE INVENTION

A hydrotreating catalyst is described which comprises at least one Group VI metal, metal oxide, or metal sulfide, at least one Group VIII metal, metal oxide, or metal sulfide, and a halogen supported on a carrier wherein (A) the catalyst comprises from about 10% to about 35% by weight of combined metal and the atomic ratio of the Group VIII metal to Group VI metal is in the range of from about 0.5:1 to about 2:1;

(B) the catalyst contains from about 0.5 to about 10% by weight of halogen;

(C) the carrier comprises from about 10 to about 50% by weight of silica and from about 40 to about 90% of alumina; and (D) the catalyst is characterized as having a median pore radius of from about 20 to about 90 Angstroms, and a surface area of from about 90 to about 230 m$^2$/g.

Also described are novel and improved procedures for preparing the carriers used to prepare the catalysts. The catalyst is useful in the production of lubricating oils from crude hydrocarbon oil stocks in that the hydrotreating process results in the formation of oils having increased viscosity indexes, reduced aromatic content and improved stability. The nitrogen and sulfur contents of the oils also are reduced through the use of the catalyst in the hydrogenation process.

DESCRIPTION OF THE PREFERRED EMBODIMENTS

The hydrotreating catalysts of the present invention comprise at least one Group VI metal, at least one Group VIII metal and a halogen on a carrier support which comprises from about 10% to about 50% by weight of silica and from about 40% to about 90% alumina. The metallic component of the catalyst can comprise any one or more of the Group VI metals together with any one or more of the Group VIII metals. Generally, the metals employed will be the chromium, molybdenum or tungsten metals of Group VI, and iron, cobalt or nickel metals of Group VIII. The metallic components can be employed either as the metals or as the oxides or sulfides of such metals. In one embodiment, a sulfided catalyst can be prepared from a catalyst wherein the metallic components are initially in a substantially unsulfided state such as, for example, a reduced metal state, the oxide of the metal or wherein the metals are only partially sulfided, and this catalyst can then be sulfided in situ, either before start-up or during the start-up of the hydrotreating process The metallic components of the catalysts also may be combinations of, for example, nickel, cobalt and molybdenum; nickel, cobalt and tungsten; nickel and molybdenum, cobalt and molybdenum; cobalt and tungsten; and especially nickel and tungsten The total metal content of the catalyst of the present invention should be in the range of from about 10% to about 35% by weight, and in one preferred embodiment, the total metal content of the catalyst is from about 15% to about 35% by weight based on the total catalyst weight. In another embodiment, the total metal content is about 20% to about 30%.

The relative amount of the Group VI metal and Group VIII metal present in the catalyst also is important and the atomic ratio of the Group VIII metal to Group VI metal should be maintained within the range of from about 0.5:1 to about 2:1. In one preferred embodiment, the atomic ratio of Group VIII metal to Group VI metal is in the range of from about 0.5:1 to about 1.5:1. In a more specific embodiment, the atomic ratio of Group VIII metal to Group VI metal is from about 0.75:1 to about 1.25:1.

The metals (Group VI and Group VIII) or a portion of the metal(s) can be incorporated into the catalyst by including the metals or a portion of the metals (such as up to about 50 or 60% of the total metal in the catalyst) in the mixture of silica and alumina used to form the support or carrier. Alternatively, and preferably, as will be described in more detail below, the support is first prepared and the metals are then impregnated into the preformed support.

The hydrotreating catalyst of the present invention also contains at least one halogen, and generally, the amount of halogen present is from about 0.5% to about 10% by weight based on a total weight of the catalyst. In one embodiment, the halogen content is from about 0.5% to about 7%, and more specifically from about 0.5% to about 5%. In one preferred embodiment, the halogen content is from about 1.5 to about 2.5 weight percent. The presence of halogen increases the activity of the catalysts with respect to hydrogenation. Although any halogen such as chlorine, bromine or iodine may be used, fluorine is preferred.

The incorporation of the halogen in the catalyst of the invention may be accomplished by the treatment of the supporting material with a hydrogen halide such as hydrogen fluoride. In this manner, fluorine can be added to the support in an amount such that the finished catalyst contains the desired amount of fluorine. The halogen also can be incorporated into the support by treatment with ammonium halide such as ammonium fluoride, ammonium bromide, ammonium chloride, etc. In one embodiment, the halogen is dissolved in the metal solution which is utilized for impregnating the support. A hydrogen fluoride solution in water is useful in this embodiment.

The halogen, or a portion of the halogen, also can be incorporated into the catalyst during the formation of the support. For example an extrudable mixture comprising alumina, silica and a halogen compound can be prepared and extruded into a support material. To this halogen-containing support then can be added the desired metals and additional halogen if desired.

Another feature of the hydrotreating catalyst of the present invention is the nature of the carrier or support. The carrier employed in the catalyst of the present invention generally comprises from about 10% to about 50% by weight of silica and from about 40% to about 90% of alumina. In one embodiment, the carrier comprises from about 10% to about 40% by weight of silica and about 60% to about 90% by weight of alumina. In one preferred embodiment, the carrier comprises from about 15% to about 30% by weight of silica. In a further embodiment, the carrier comprises from about 15% to about 25% by weight of silica and from about 75% to about 85% by weight of alumina. In addition to the Group VI and Group VIII metals and halogen which may be present in the support as described above, other materials may be present in amounts of up to about 20% by weight of the total support material. Such materials include, for example, magnesia or titania. The carrier can also be modified to include other materials to increase the hydrocracking activity of the catalyst at lower temperatures.

The hydrotreating catalyst of the invention can be prepared employing any of the techniques for the preparation of multi-component catalysts known in the art. In one embodiment, the catalysts can be prepared by preparing a calcined silica-alumina support (with or without optional materials described above), and thereafter impregnating the calcined support with a solution (generally aqueous) containing the salts of the desired metals and a halogen compound. Generally one impregnation step is sufficient to provide a catalyst containing the desired metal content although in some instances, particularly at the higher levels of metals, multiple impregnation steps may be utilized. Generally, water-soluble salts of the Group VI and Group VIII metals such as nitrates, oxalates, acetates, ammonium salts, etc., may be employed, and after the salts have been impregnated into the carrier, these salts will usually be converted to the corresponding metal oxides by calcining. Tungsten can be conveniently incorporated from the meta-tungstate such as, for example, ammonium meta-tungstate. Ammonium para-tungstate also is suitable. Molybdenum can be conveniently incorporated from a molybdate salt, e.g., ammonium molybdate. Nickel and cobalt are incorporated using water solutions of salts such as nickel nitrate hexahydrate, cobalt nitrate hexahydrate, etc.

Formation of the sulfide can be effected in any known manner. One satisfactory procedure is to contact the catalyst containing the oxides of the metals with a mixture of hydrogen sulfide and hydrogen at elevated temperatures. Complete sulfiding is not necessary, but generally, sulfiding to above about 5% is desirable.

The catalyst support is prepared generally by extruding mixtures comprising silica and alumina (and other optional materials such as described above) followed by drying and calcination. All types of aluminas, silicas or co-precipitated silica-aluminas can be used in the preparation of the carrier. In one embodiment, the aluminas are pseudoboehmites and/or alpha-monohydrates. The silicas may be either gels, co-precipitated silica-alumina powders, silicic acid or silica sols. Mixtures of aluminas and mixtures of silicas may be utilized in the preparation of the support material. Water may be, and generally is, used in the preparation of the silica-alumina mixture in order to provide the desired consistency for extrusion. The amount of water added to the mixture will depend upon the nature and source of the silica and alumina as well as the type of mixer and extruder being utilized. The amount of water as well as the preferred consistency of the mixture can be readily determined by one skilled in the art. Any of the well known commercially available mixers and extruders can be used in the preparation of the carrier support so long as they produce catalysts with sufficient physical integrity.

In one preferred embodiment, the carrier or substrate is prepared from a mixture of colloidal silica and alumina. This embodiment for preparing the carrier or support for the catalyst generally involves the steps of
(A) providing an acidic silica sol;
(B) preparing an extrudable mixture comprising the acidic silica sol, alumina and water;
(C) extruding the mixture to form an extrudate; and
(D) calcining the extrudate at an elevated temperature.

An important feature of this embodiment is the preparation of an acidic silica sol. Aqueous silica sols are available commercially and may be prepared by techniques well known to those skilled in the art. The aqueous silica sols can be, and often are, stabilized by the addition of ammonia. The acidic aqueous silica sol useful in this embodiment can be prepared by the addition of an acid to an aqueous silica sol until the pH of the acidified mixture is in the range of from about 2 to about 5. Although a variety of acids can be utilized, including organic acid such as formic or acetic acids, the acid generally is a mineral acid such as nitric acid or hydrochloric acid. The weight of acid added to the silica sol would be dependent upon the nature of the acid and the desired pH. Generally, the amount of mineral acid used in the process for preparing the carrier or support is from about 2 to about 5% by weight of the acid based on the dry, combined weight of alumina and silica.

In this embodiment of the invention, the mixture prepared in step (B) comprises, on a dry basis, from about 10 to about 50% by weight of silica and from about 40 to about 90% by weight of alumina. The mixture of (B) also may contain other materials such as magnesia, titania or mixtures of magnesia and titania as well as various amounts of the Group VI and Group VIII metals and, optionally, a halide.

The extrudate which is obtained by extruding the above-described mixtures may be, and generally is dried before it is calcined at an elevated temperature. The extrudates are calcined at temperatures of at least about 400° C. and more generally at temperatures of from 500° to about 600° C. although temperatures as high as 1200° C. can be utilized. It generally has been observed that it is preferred to utilize lower calcination temperatures where smaller pores are desired.

The size and shape of the extruded support can be varied over a wide range although the size generally is from about 1/64-inch to about ½-inch in diameter. The shape of the support can be in the form of extruded or tabletted cylinders, polylobal extrusions, spheres, rings, hollow core cylinders, or any other appropriate geometric shape.

After the calcined carrier support has been impregnated with the Group VI and VIII metals and halogen, the impregnated support is dried and calcined to convert the metals to metal oxides. Any type of drier and drying temperature can be used so long as the extrudates are dried sufficiently so that they do not break up on calcination. It is possible in some instances to effect a one-step drying-calcination if a proper time-temperature cycle is established. Calcination temperatures of at least about 400° C. up to about 1200° C. can be used. Calcinating converts the metals in the catalysts to metal oxides. Both under-calcination and over-calcination generally are detrimental. Any type of calciner, such as a rotary kiln, tunnel kiln, vertical calciner, etc., can be used as long as the metals are converted to metal oxides.

It also is possible in some instances, to prepare the hydrotreating catalyst by adding all portions of the active ingredients into an extrusion mix followed by extruding, drying and calcination. In another embodiment, a mixture of the above type may be prepared in which only part of the metals or halogen have been added to the mixture, and after extrusion and calcining, the balance is added via impregnation followed by drying and calcination.

The hydrotreating catalysts of the present invention which may be prepared by any of the techniques described above are characterized as having acceptable crushing strengths (15–40 pounds), median pore radii of from about 20 to about 90 Angstroms, total pore volume of from about 0.2 to about 0.5 cc/g. and surface areas of from about 90 to about 230 m²/g. Although all of these physical properties are important, the median pore radius, total pore volume and surface area of the catalysts are particularly significant with regard to the effectiveness of the hydrotreating catalysts. In one embodiment, the median pore radius is from about 20 to about 55 Angstroms and the surface area of the catalysts is from about 90 to about 230 m²/g.

The hydrotreating catalysts of the invention also are characterized as having relatively low surface acidity. Generally, the surface acidity will be below about 11 cc/g. as measured by ammonia chemisorption, and more often will be between about 7 or 8 to about 10 or 11. The hydrotreating catalysts of the invention also are characterized as containing essentially no macropores. Macropores are defined in the art as pores greater than 600A° in diameter. The macropore volume content of the preferred catalysts of the invention generally is less than about 0.040 cc/g. and more often is less than 0.020 or 0.010 cc/g. In some catalysts of the invention the macropore volume content is 0.000 to 0.005 cc/g.

The following examples illustrate the preparation of the hydrotreating catalysts of the present invention including the preparation of the carrier supports. Unless otherwise indicated in the examples or elsewhere in the specification and claims, all parts and percentages are by weight, and temperatures are degrees entigrade. The surface areas, pore volumes, and pore diameters are measured by mercury intrusion porosymmetry.

EXAMPLE 1A

Into a mix muller blender there is charged 15 pounds of hydrated alumina available from Condea Chemie under the trade designation Pural TM SB (boehmite) and 15 pounds of Versal ® 250 alumina (boehmite/pseudoboehmite) available from Kaiser Aluminum and Chemical Corporation. The aluminas are mixed to uniformity for about 2 to 3 minutes. In a separate vessel, a silica sol is prepared by adding 14 pounds of water and 1.36 pounds of 70% nitric acid to 13.6 pounds of an ammonia stabilized silica sol (containing about 40% $SiO_2$) available from Nalco Chemical Company under the trade designation Nalco 2327 and mixing to uniformity. The silica sol is added to the alumina blend and mixed thoroughly. An additional 6.61 pounds of water are added to the mixture to adjust the volatile content of the mixture to about 55%, and mixing is continued until the desired plasticity is achieved (an extrudable mixture). The mixture then is extruded using a Welding Engineers Extruder equipped with a die plate with 0.070-inch diameter round holes. The extrudate is dried for about 16 hours at 125° C. and then calcined in a rotary calciner at 580°–590° C. to develop a surface area of about 240–250 m²/g. The catalyst support prepared in this manner has the following typical properties.

$SiO_2$: 20%
$Al_2O_3$: 80%
surface area: 243 m²/g
pore volume: 0.66 cc/g
crushing strength: 15 pounds
diameter: 0.063 inches

EXAMPLE 1B

An aqueous impregnating solution is prepared at a concentration which yields in the finished catalyst composition, 6% nickel, 19% tungsten and 2% fluorine. The solution is prepared by dissolving 1746.3 grams of ammonium meta tungstate in 1200 cc of tap water. To this solution there is added 1996.4 grams of nickel nitrate hexahydrate ($Ni(NO_3)_2.6H_2O$) and 295 grams of 48% hydrofluoric acid with mixing. The resulting solution is diluted to a total volume of 3150 cc. which is the approximate total pore volume contained in 4500 grams of dried support prepared as in Example 1A. A support prepared as in Example 1A (4500 grams) is then impregnated by continuously adding the above solution to the dried extrudate with mixing. The impregnated extrudates are dried overnight at 125° C. and then calcined in a rotary furnace at 500° C. to convert the metals to oxides. The typical properties of a catalyst prepared in this manner are as follows:
  nickel: 6%
  tungsten: 19%
  fluorine: 2%
  $SiO_2$: 13%
  surface area: 152 m$^2$/g
  total pore volume: 0.42 cc/g
  Avg. pore radius: 36A°
  crushing strength: 20 pounds
  diameter (ave): 0.063 inch

EXAMPLE 2A

Into a blender there is added 1250 grams of the silica sol used in Example 1A (Nalco 2327), 1350 grams of water and 125 grams of 70% nitric acid, and the mixture is thoroughly blended. This blended mixture then is added to 2000 grams of alumina (Pural, SB, Condea) and mixed thoroughly. Additional water is added as necessary to provide the desired plasticity (about 1350 grams of water). The mixture is then extruded through a die plate with 0.070-inch diameter round holes. The extrudate is dried at about 125° C. and then calcined in an oven at about 500° C. for about 2 hours.

EXAMPLE 2B

The calcined support prepared in Example 2A is impregnated with nickel, tungsten and fluorine in a two-step process. A support (400 grams) is impregnated wth 204 cc. of an aqueous solution containing 156.89 grams of ammonium metatungstate [6(NH$_4$)$_2$.12(WO$_3$).-H$_2$O]. After drying for about 6 hours at 110° C., the tungsten-containing support is treated with 161 cc. of an aqueous solution of 178.35 grams of nickel nitrate hexahydrate and 25.1 grams of 48% hydrogen fluoride. The impregnated support is dried at 110° C. and thereafter calcined at about 500° C. for about 2 hours.

The catalyst prepared in this manner is characterized as follows:
  nickel: 6%
  tungsten: 19.3%
  fluorine: 1.8%
  Avg pore radius: 40A°
  total pore volume: 0.242 cc/g
  surface area (BET): 141.8 m$^2$/g

EXAMPLE 3A

A mixture of 9993 grams of Nalco 2327 silica sol and 522 grams of 67% nitric acid is prepared and blended with 7500 grams of Pural SB. Water is added to the blender as required to provide an extrudable mixture. The mixture then is extruded using a die plate with 0.070-inch diameter round holes. The extrudate is dried at about 125° C. and calcined at about 500° C. for 2 hours.

EXAMPLE 3B

The catalyst support prepared in Example 3A (392 grams) is impregnated with 165 cc. of an aqueous solution containing 151.4 g. of ammonium metatungstate and dried at about 125° C. for 5 hours. The tungsten impregnated catalyst support is impregnated with 98.6 cc. of a mixture of 172.5 g. of nickel nitrate hexahydrate and 25.6 g. of 48% hydrogen fluoride over a period of 15 minutes and dried at about 125° C. overnight. The impregnated support then is calcined at a temperature of about 480° C. for 2 hours. In this example, the catalyst support contains 40% silica and 60% alumina, and the final catalyst contains about 4.8% nickel, 19.6% tungsten and 1.4% fluorine. The catalyst has a surface area of about 121 m$^2$/g and a pore volume of about 0.26 cc/g.

EXAMPLE 4A

Sixty percent nitric acid (1.95 pounds) is added to 62.4 pounds of Nalco 2327 silica sol and mixed with a high-speed homogenizer. Titanium dioxide powder (8.9 pounds, Anatase, Gulf Chemical) is added slowly to the silica sol/nitric acid solution, and when the titanium dioxide appears to be uniformly dispersed, the slurry is added to 33.3 pounds of alumina (Kaiser Versal 250) and thoroughly mixed. Subsequently, an additional one liter of water is added to form the desired mix consistency. The mixture is extruded through a 0.70-inch die plate and the extrudate is dried. The dried extrudate is calcined for one hour with air at 500° C. in a batch rotary furnace.

EXAMPLE 4B

A solution is prepared by dissolving 500 grams of ammonium metatungstate in 335 ml. of water. The solution is used to impregnate 1227.9 grams of the support prepared in Example 4A. The impregnated support is dried at 125° C. overnight.

A solution of about 600 grams of nickel nitrate in 150 ml. of tap water is prepared with agitation, and 90.1 grams of 48% hydrofluoric acid are added to form the desired nickel solution. The nickel solution is impregnated into the dried tungsten impregnated support, and the impregnated extrudate is dried at 125° C. overnight. The dried extrudate then is calcined in a muffle furnace at about 500° C. for one hour with air. The calcined extrudate is the desired product containing 6.26% nickel, 19.3% tungsten, 2.12% fluorine, 9.59% titania and 26.0% silica. The surface area of the particles is about 104 m$^2$/g, and the pore volume is about 0.30 cc/g.

EXAMPLE 5B

Molybdenum trioxide (326 grams) is added slowly to 220 ml. of water with agitation. To this mixture there is added 170 ml. of reagent ammonium hydroxide (29% ammonia) with stirring and the mixture is diluted to 570 ml. with water. This solution is used to impregnate 1900 grams of a titania/alumina/silica support prepared as in Example 4A. The impregnated support is dried overnight at 125° C. and thereafter calcined in a muffle furnace at 450° C. with air for about one hour.

A solution of 361 grams of nickel nitrate hexahydrate in 200 ml. of water is prepared with agitation, and 60.7 grams of 48% hydrogen fluoride reagent are added. The mixture is diluted with water to 400 ml. and this solution is used to impregnate the calcined molybdenum impregnated support. After impregnation with the nickel solution, the extrudate is dried overnight at 125° C. and calcined in a muffle furnace with air at 450° C. for about one hour. The hydrotreating catalyst prepared in this manner contains 5.5% nickel, 17.0% molybdenum and 2.2% fluorine The catalyst has a surface area of 92 m$^2$/g.

EXAMPLE 6B

The general procedure of Example 5B is repeated except that the calcined support is impregnated with an aqueous solution containing 5% nickel, 15% molybdenum and 4% fluorine. The impregnated support is dried at 125° C. for 10 hours.

EXAMPLE 7A

An alumina/silica/titania support is prepared utilizing 2000 grams of alumina (Kaiser), 158 grams of titania, 112 grams of Nalco 2327 silica sol, 94.3 grams of 67% nitric acid solution and 675 grams of water utilizing the general procedure described in Example 4A. Additional water is added as necessary to provide the desired consistency, and the mixture is extruded through a 0.070 die plate. The extrudate is dried at 125° C. and calcined at 500° C. for about 2 hours. The support prepared in this manner contains about 7.5% titania, 21.25% silica and 71.25% alumina by weight.

EXAMPLE 7B

A portion (460 grams) of the support prepared in Example 7A is impregnated with 299 cc of an aqueous solution containing 180.33 grams of ammonium metatungstate over a 15-minute period. The impregnated support is dried at 125° C. for 6 hours.

The tungsten-impregnated support is impregnated with 224 cc of an aqueous solution containing 205.49 grams of nickel nitrate hexahydrate and 30.5 grams of 48% hydrofluoric acid over a 30-minute period followed by drying at 125° C. overnight. The impregnated support is calcined at 500° C. for 2 hours. The catalyst prepared in this manner contains 6.1% nickel, 19.8% tungsten and 2.1% fluorine. The surface area of the catalyst is 128 $m^2/g$, and the pore volume is 0.36 cc/g.

EXAMPLE 8A

A mixture of 9437 grams of Kaiser Versal 250 alumina (Kaiser) and 2178 grams of magnesium carbonate is prepared, and to this mixture there is added a solution prepared from 15,751 grams of Nalco 2327 silica sol and 691 grams of 67% nitric acid. The mixture is agitated until the mixture becomes uniform and is extrudable. The mixture is extruded through a 0.070 die plate and the extrudate is dried at about 125° C. and thereafter calcined at a temperature of 500° C. for 2 hours. The support comprises 50% alumina, 43% silica and 7% magnesia.

EXAMPLE 8B

A portion of the support prepared in Example 8A (452.2 grams) is impregnated with 313.4 cc of aqueous solution containing 178.06 grams of ammonium metatungstate, and the impregnated support is dried for 6 hours at 125° C. The dried support is then impregnated with 268.7 cc of an aqueous solution containing 202.9 grams of nickel nitrate hexahydrate and 30.1 grams of 48% hydrofluoric acid over a period of 15 minutes. The impregnated support is dried at 125° C. overnight and calcined at 500° C. for 2 hours. The catalyst prepared in this manner contains 6.0% nickel, 19.5% tungsten and 2.3% fluorine. The surface area of the catalyst is 107 $m^2/g$, the median pore radius is 80.7 Angstroms and the total pore volume is 0.32 cc/g.

EXAMPLE 9A

The general procedure of Example 8A is repeated utilizing 7692 grams of Versal 250, 1775 grams of magnesium oxide, 12,840 grams of the silica sol (40% $SiO_2$) and 563 grams of 67% nitric acid. The extrudate is dried at 125° C. overnight and then calcined at 500° C. for 2 hours. This support comprises 42.5% alumina, 42.5% silica and 15% magnesia.

EXAMPLE 9B

A portion of the support prepared in Example 9A (358 grams) is first impregnated with 240 cc of an aqueous solution containing 138.25 grams of ammonium metatungstate over a 15-minute period and thereafter dried for 5 hours at 125° C. The tungsten impregnated support then is impregnated with 204.7 cc of an aqueous solution containing 157.54 grams of nickel nitrate hexahydrate and 23.4 grams of 48% hydrofluoric acid over a 15-minute period. The impregnated support is dried overnight at 125° C. and calcined at 500° C. for 2 hours yielding the desired product. The catalyst prepared in this manner contains 5.8% nickel, 18.7% tungsten and 2.3% fluorine. The surface area of the catalyst is 94 $m^2/g$, the median pore radius is 94.3 and the pore volume is 0.37 cc/g.

EXAMPLE 10A

To 11.6 gallons of deionized water there is added 1025 grams of 70% nitric acid with agitation. Alumina (15.2 pounds, Condea Pural SB) is added gradually followed by 152 pounds of colloidal silica containing 4.5% silica and prepared by ion exchange of sodium silicate to form a slurry. To this slurry there is added a solution of 800 ml. of 29% ammonia in 4 liters of water. The addition rate is adjusted to reach a pH of 7.0 in 25–35 minutes, and the addition is terminated at a pH of 7.0. The slurry is filtered and the filter cake is washed with water. The cake is air dried for 20 minutes with compressed air. The cake is reslurried in 5 gallons of deionized water and spray dried at 150°–160° C. oulet temperature. The spray-dried powder (33.3 pounds) is charged to a mixer and an acid solution prepared by dissolving 5.71 pounds of 70% nitric acid reagent grade into 5 pounds of water is added to the mixture over a 5 to 7-minute period. Mixing is continued for an additional 40–45 minutes until the mix begins to ball-up slightly and reaches 40° C. The mixture then is extruded through a die plate having 0.070-inch diameter holes. The extrudate (1/16-inch) is dried at 125° C. and calcined at 500° C.

EXAMPLE 10B

A portion of the silica alumina support prepared in Example 10A (641 grams) is impregnated with 308 cc of an aqueous solution containing 247.4 grams of ammonium metatungstate, and thereafter the pellets are dried at 125° C. for 6 hours.

An aqueous solution is prepared containing 282 grams of nickel nitrate hexahydrate and 42 grams of reagent grade hydrofluoric acid. The tungsten impregnated pellets are impregnated with the nickel solution over a 15-minute period and thereafter dried overnight at 125° C. The dried pellets are calcined at about 500° C. for 2 hours. The catalyst prepared in this manner contains 5.7% nickel, 19.8% tungsten and 1.6% fluorine. The surface area of the catalyst is 154 $m^2/g$, and the pore volume is 0.25 cc/g.

EXAMPLE 11A

The general procedure of Example 10A is repeated except that the powder is tray dried rather than spray dried.

The hydrotreating catalysts of the present invention are useful in the upgrading of crude hydrocarbon oil stocks and producing lubricating oils or lubricating oil base stocks by way of catalytic hydrogenation. The crude hydrocarbon oil stocks treated with the catalysts of the present invention and in accordance with the process of the present invention may be any of the oil stocks commercially available and known in the art including gas oils and heavy gas oils. The crude lubricating oil stocks which can be hydrotreated with the catalysts of the present invention include oil stocks usually boiling predominantly above 600° F. or 650° F. and include stocks ranging from light distillates to heavy gas oils obtained from vacuum or atmospheric towers. Examples of crude oils which can be hydrotreated with the catalysts and process of the invention include heavy vacuum gas oils such as Sumatran Light, Arabian Light, Kuwait, Sumatran Heavy, California Light, California Heavy, etc.

The catalysts of the invention are particularly effective in the treatment of crude lubricating oil stocks which have been obtained from a residual material which has been treated to lower the sulfur, nitrogen and asphaltene contents to a level below that of the original residue. One example of such a treated stock is a residual stock which has been deasphalted employing a light paraffinic solvent.

While the catalyst and process of the present invention are suitable to obtain products having viscosity indexes varying over a wide range, the catalyst and process of the invention can be advantageously employed to yield products having comparatively high viscosity indexes. For example, the catalysts and process of the invention can be used to yield products having viscosity indexes in the range of from about 100 to about 125 or higher in higher yields and at lower reaction temperatures. It should also be noted that the production of an oil having an enhanced viscosity index can be achieved without sacrificing other desirable features of the process such as, for example, high yield of oil, or other desirable characteristics of the oil such as low aromatic content.

The hydrotreating process of the present invention utilizing the hydrotreating catalyst of the present invention may be conducted at temperatures in the range of from about 250° C. to about 500° C., more specifically within the range of from about 300° C. to about 425° C. Reactions also are conducted under pressures in the range of from about 750 to about 5000 psig and more specifically in the range of from about 2000 to about 3000 psig. The liquid hourly space velocity (LHSV) can be varied over a wide range although generally from about 0.1 to about 10 volumes of crude lubricating oil stock per volume of catalyst per hour, and a hydrogen feed rate of from about 2000 to about 20,000 standard cubic feet (scf) per barrel of crude lubricating oil stock and preferably from about 4000 to about 10,000 scf of hydrogen per barrel of crude oil stock are maintained during the reaction. It is not necessary that pure hydrogen be employed in the process, and a hydrogen-containing stream comprising from about 60% to about 99% of hydrogen is satisfactory. The hydrogen-containing streams generally available in refinery operations contain from about 85% to about 95% of hydrogen gas, and such streams are useful.

The particular operation conditions to be used in any specific hydrotreating operation will, of course, vary to a certain extent depending upon the properties of the charge stock being treated and the results desired. Accordingly, the operating conditions to be employed in the hydrotreating process should be selected so as to produce a hydrotreated material having the desired characteristics including higher viscosity index and reduced aromatics, sulfur and nitrogen content. Also, the operating conditions employed in the hydrotreating process must be selected, in conjunction with the catalyst, to reduce a degree of random carbon-to-carbon cleavage typical of hydrocracking and to minimize production of substantial amounts of lower boiling materials.

As mentioned above, the hydrotreating catalysts of the present invention are useful in treating crude oils for improving the viscosity index and reducing the amount of aromatics present. In practice, lubricating oil producers generally use multiple hydrotreating steps or stages on the crude oils. Generally, the function of the first stage is to improve the viscosity index of the lubricating oil (via hydrocracking) and to remove nitrogen, sulfur and metals. The second stage effects hydrogenation of the oil (which is generally dewaxed between the first and second stage) to improve its stability. Stabilization involves the conversion of unsaturated hydrocarbons such as olefins and aromatics to saturated materials such as paraffins and naphthenic materials. Stabilization, to a lesser extent, also involves removing objectionable elements from the lubricating feedstocks, and such impurities usually consist of sulfur, nitrogen, oxygen, halides and trace metals.

In a one stage or single pass operation, the oil and hydrogen generally are preheated to reaction temperature and passed through a series of catalyst beds in one or more reactors. The reactor effluent is cooled and separated into gas and liquid streams. Unreacted hydrogen is recycled. Since the overall reaction is exothermic, the temperature rise in each catalyst bed is controlled by either gas quench, liquid quench or indirect cooling between beds. The liquid stream passes to an atmospheric stripper where gaseous hydrocarbons and light fractions are removed. The bottoms fraction is charged to a vacuum tower for preparation into the desired waxy lube products.

Figure 1:
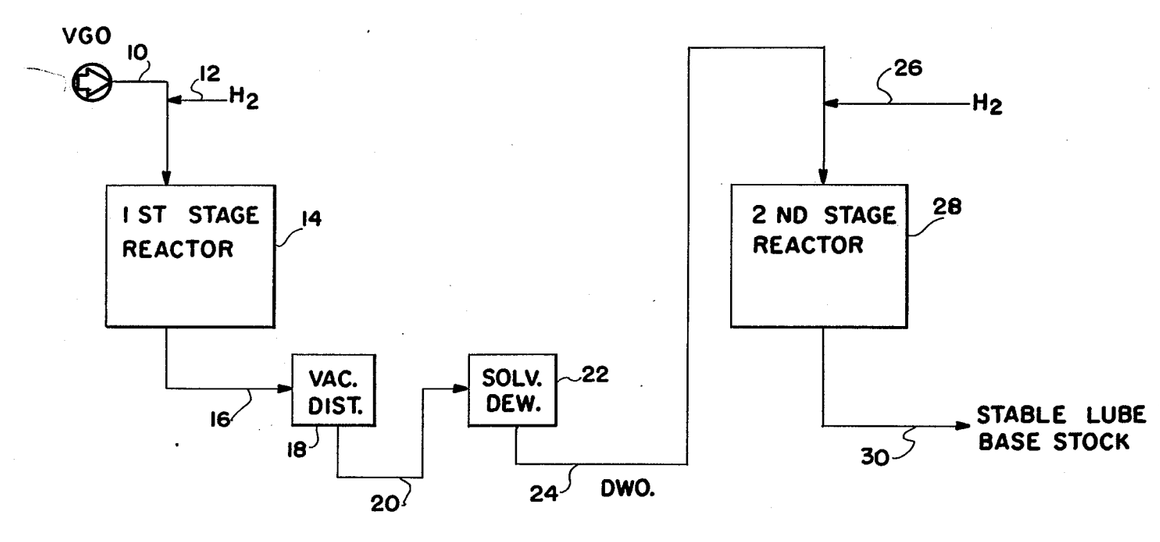
FIG. 1 is a schematic flow diagram of a typical two-stage process for hydrotreating a lubricating oil base stock.

Although single stage operations are effective in hydrotreating crude oil base stocks, most commercial lubricating oil producers utilize multiple stage and multiple catalyst systems to achieve the desired conversion of the various aromatic-containing lubricating oil feedstocks to oils having the desired properties. Generally, multiple stage preparations will consist of two and sometimes three hydrogenation stages. FIG. 1 is a schematic flow diagram of a two stage process for hydrotreating a lubricating oil base stock. Because of the different catalytic functions of each of the stages, current practice requires the use of different catalysts in the two stages. The primary alteration of the components of the feedstock is accomplished in the first stage where a significant amount of cracking occurs in conjunction with hydrotreating. There is some reduction of aromatic content. As a result of these changes, the oil undergoes a desirable increase in the viscosity index. Thus, the performance of the first stage is measured by the yield and the viscosity index of the effluent. Some purification of the oil also occurs in the first stage. Thus, sulfur compounds are converted into hydrogen sulfide and other compounds through various desulfurization reactions. Nitrogen compounds are converted into ammonia and pure hydrocarbons through various denitrogenation reactions, and naphthenic acids are converted into naphthenes through various dehydration and decarboxylation reactions. As a result, the reactor effluent from the first stage shows a marked improvement in color, thermal stability and oxidation stability with some decrease in aromatic content.

The second stage converts and saturates the desired aromatic compounds with emphasis on the 4, 5, 6 and greater aromatic rings. These hydrogenation reactions increase the naphthenic content of the oil. There is little or no change in the viscosity index of the oil as a result of the second stage treatment. When compared to the first stage, the second stage is more of a finishing or polishing step where mild hydrogenation occurs and product stability is improved.

FIG. 1 illustrates one two-stage process which is typical of two-stage processes currently being used for hydrotreating lubricating oils. In the process illustrated in FIG. 1, vacuum gas oil 10 (VGO) and hydrogen (H₂) 12 are fed to the first-stage reactor 14 which contains a hydrotreating catalyst. In a typical process, the pressure in the first stage is about 3000 psig and temperatures are in the range of 700°-800° F. The effluent from the first-stage reactor 16 is subjected to vacuum distillation 18 to remove volatile materials, and the residue 20 is subjected to a solvent de-waxing step in a suitable apparatus 22 utilizing procedures well known to those skilled in the art. The de-waxed oil (DWO) 24 is mixed with additional hydrogen 26 and fed to the second stage reactor 28 which also contains a hydrotreating catalyst. Typically, the second stage reactor is operated at a temperature of from about 500° F. to about 600° F. at a pressure of about 3000 psig. The effluent from the second-stage reactor 30 is the desired lubricating oil base stock.

As mentioned above, prior art processes generally have utilized different hydrotreating catalysts in the first and second stage reactors because of the two different processes and reactions which occur in the two stages. One of the unique features of the hydrotreating catalysts of this invention is that the catalyst can be used effectively in both stages, and, therefore, the use of the catalysts of this invention in both stages simplifies the hydrotreating processes and eliminates the need for maintaining an inventory of two separate catalysts. It has been discovered that the catalyst of the present invention is effective in a first-stage operation such as illustrated in FIG. 1, and the use of the catalyst results in effluents having excellent characteristics which are generally improved over the characteristics obtained with some of the presently commercially utilized catalysts. In general, at given viscosity indexes, increased yields are obtained, and denitrogenation, dearomatization and desulfurization are superior. When used in the second stage of a two-stage hydrotreating process such as illustrated in FIG. 1, the catalyst of the present invention, as compared to some commercially available second-stage catalyst, results in increased removal of aromatics in the lubricating oil at lower operating temperatures.

The utility of the hydrotreating catalyst of the present invention on heavy gas oils is illustrated in the following example conducted on a Kuwait heavy vacuum gas oil (HVGO).

The Kuwait heavy vacuum gas oil is characterized as follows:

| | |
|---|---|
| gravity, API | 18.4 |
| sulfur content (wt. %) | 3.52 |
| nitrogen content (ppm) | 1390 |
| aromatic content (wt. %) | 64 |
| D-1160 vacuum dist., °F. (% over) | |
| 5 | 715 |
| 10 | 870 |
| 30 | 969 |
| 50 | 997 |
| 70 | 995 |
| 90 | 1050 |

For comparison purposes, the process also is conducted on the Kuwait HVGO utilizing commercially available hydrotreating catalysts for the first and second stages such as described in U.S. Pat. Nos. 3,078,238 and 3,046,218. The catalyst of the present invention utilized in this example is similar to the catalyst described in Example 1B.

The first stage reaction conditions utilized in this example are: temperature, 385°-400° C.; pressure, 2500 psig.; LHSV, 1.0 vol./vol./hr.; hydrogen flow rate, 7500 SCF/Bbl. When compared to a commercially available catalyst, the catalyst of Example 1B increases the yield of high viscosity index effluent and results in an increased reduction in the aromatics content, nitrogen content and sulfur content of the effluent.

After vacuum distillation and solvent dewaxing of the effluent from the first stage, the effluent is subjected to a second stage hydrotreating process as illustrated in FIG. 1 utilizing the catalyst of Example 1B as representative of the catalyst of the present invention. For comparison, the process also is conducted utilizing a commercially available catalyst generally recommended for use in such second stage reactor. The reaction conditions of the second stage are: temperature, 500°-550° F.; pressure, 2500 psig.; LHSV, 0.5 vol./vol./hr.; and hydrogen flow rate, 5000 SCF/Bbl.

The goal of the second stage lube finishing is to impart stability against oxidation. Various criteria can be used to evaluate stability, and two common ones are aromatics content and UV absorbance. The results of this second stage reaction utilizing the catalyst of Example 1B compared to the commercially available catalyst demonstrate that the catalyst of the present invention produces an effluent oil containing significantly less aromatics, and the amount of aromatic contained in the effluent is reduced as the reaction temperature is increased from 500° to 525° and 550° F. The UV light stability of the effluent from the second stage utilizing the catalyst of the present invention is significantly improved over the UV light stability of the effluent obtained utilizing the commercial catalyst in the second stage.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A hydrotreating catalyst comprising at least one Group VI metal, metal oxide, or metal sulfide, at least one Group VIII metal, metal oxide, or metal sulfide, and a halogen supported on a carrier wherein
   (A) the catalyst comprises from about 10% to about 35% by weight of combined metal and the atomic ratio of the Group VIII metal to Group VI metal is in the range of from about 0.5:1 to about 2:1;
   (B) the catalyst contains from about 0.5 to about 10% by weight of halogen;
   (C) the carrier comprises from about 10 to about 40% by weight of silica and from about 40 to about 90% of alumina; and
   (D) the catalyst is characterized as having a median pore radius of from about 20 to about 90 Angstroms, and a surface area of from about 90 to about 230 m²/g.

2. The hydrotreating catalyst of claim 1 wherein the catalyst contains from about 15 to about 35% by weight of combined metal.

3. The hydrotreating catalyst of claim 1 wherein the atomic ratio of Group VIII metal to Group VI metal is from about 0.5:1 to about 1.5:1.

4. The hydrotreating catalyst of claim 1 wherein the halogen is fluorine.

5. The hydrotreating catalyst of claim 1 containing from about 0.5 to about 5.0 weight percent of halogen.

6. The hydrotreating catalyst of claim 1 wherein the carrier also contains up to about 20% by weight of magnesia, titania or mixtures thereof.

7. The hydrotreating catalyst of claim 1 wherein the catalyst is characterized as having a median pore radius of from about 20 to about 55 Å.

8. The hydrotreating catalyst of claim 1 characterized as having a surface area of from about 130 to about 190 m²/g.

9. A hydrotreating catalyst comprising at least one Group VI metal, metal oxide, or metal sulfide, at least one Group VIII metal, metal oxide, or metal sulfide, and a halogen supported on a carrier wherein
   (A) the catalyst comprises from about 15% to about 35% by weight of combined metal and the atomic ratio of the Group VIII metal to Group VI metal is in the range of from about 0.5:1 to about 2:1;
   (B) the catalyst contains from about 0.5 to about 10 weight percent of halogen;
   (C) the carrier comprises from about 10 to about 40% by weight of silica and from about 40 to about 90% of alumina; and
   (D) the catalyst is characterized as having a median pore radius of from about 20 to about 90 Angstroms, and a surface area of from about 130 to about 230 m²/g.

10. The hydrotreating catalyst of claim 9 wherein the Group VIII metal is nickel and the Group VI metal is tungsten or molybdenum.

11. The hydrotreating catalyst of claim 9 wherein the atomic ratio of Group VIII metal to Group VI metal is from about 0.5:1 to about 1.5:1.

12. The hydrotreating catalyst of claim 9 wherein the halogen is fluorine.

13. The hydrotreating catalyst of claim 9 containing from about 0.5 to about 5.0 weight percent of halogen.

14. The hydrotreating catalyst of claim 9 wherein the carrier also contains up to about 20% by weight of magnesia, titania, or mixtures thereof.

15. The hydrotreating catalyst of claim 9 wherein the catalyst is characterized as having a median pore radius of from about 20 to about 55 Å.

16. The hydrotreating catalyst of claim 9 characterized as having a surface area of from about 130 to about 190 m²/g.

17. A hydrotreating catalyst comprising at least one Group VI metal, metal oxide or metal sulfide, at least one Group VIII metal, metal oxide, or metal sulfide, and a halogen supported on a carrier wherein
   (A) the catalyst contains from about 20 to about 30% by weight of combined metal, and the atomic ratio of the Group VIII to Group VI metal is in the range of from about 0.5:1 to about 1.5:1;
   (B) the catalyst contains from about 1.5 to about 2.5% by weight of fluorine;
   (C) the carrier comprises from about 15 to about 30% by weight of silica and from about 50 to about 85% by weight of alumina; and
   (D) the catalyst is characterized as having a median pore radius of from about 20 to about 55 Angstroms at a surface area of from about 130 to about 190 m²/g.

18. The catalyst of claim 17 wherein the Group VIII metal is nickel and the Group VI metal is tungsten or molybdenum.

19. The catalyst of claim 17 wherein the carrier also contains up to about 15% of magnesia, titania, or mixtures thereof.

20. The catalyst of claim 17 containing from about 24 to about 26% by weight of combined metal.

21. The catalyst of claim 17 wherein the atomic ratio of Group VIII metal to Group VI metal is from about 0.75 to about 1.25.

22. The catalyst of claim 17 wherein the carrier comprises from about 15 to about 25% by weight of silica.

23. The catalyst of claim 17 is characterized as having a surface area of from about 140 to about 160 m²/g.

24. A hydrotreating catalyst comprising nickel, nickel oxide, or nickel sulfide, tungsten, tungsten oxide or tungsten sulfide, and fluorine supported on a carrier wherein
   (A) the catalyst contains from about 24 to about 26% by weight of combined metal and the atomic ratio of nickel to tungsten is about 1;
   (B) the catalyst contains from about 1.5 to about 2.5% by weight of fluorine;
   (C) the carrier comprises from about 15 to about 25% by weight of silica and from about 75 to about 85% by weight of alumina; and
   (D) the catalyst is characterized as having a median pore radius of from about 20 to about 55 Angstroms and a surface area of from about 130 to about 190 m²/g.

25. A process for preparing a catalyst support comprising silica and alumina which comprises the steps of
   (A) providing an acidic silica sol;
   (B) preparing an extrudable mixture comprising the acidic silica sol, alumina and water;
   (C) extruding the mixture to form an extrudate; and
   (D) calcining the extrudate at an elevated temperature.

26. The process of claim 25 wherein the acidic silica sol is prepared by the addition of an acid to an aqueous silica sol until the pH of the acidified mixture is in the range of from about 2 to about 5.

27. The process of claim 26 wherein the aqueous silica sol is stabilized with ammonium ions.

28. The process of claim 26 wherein the acid is a mineral acid.

29. The process of claim 28 wherein the amount of mineral acid incorporated into the mixture is from about 2 to about 5% by weight of the acid based on the dry, combined weight of alumina and silica.

30. The process of claim 28 wherein the acid is nitric acid.

31. The process of claim 25 wherein the mixture prepared in (B) comprises, on a dry basis, from about 10 to about 50% by weight of silica and from about 40 to about 90% by weight of alumina.

32. The process of claim 25 wherein the mixture of (B) also contains a minor amount of magnesia, titania or mixtures thereof.

33. The process of claim 25 wherein the mixture prepared in step (B) also contains at least one metal selected from the group consisting of Group VIII metals or metal oxides, or mixtures thereof.

34. The process of claim 25 wherein the mixture prepared in step (B) also contains at least one halogen compound.

35. The process of claim 25 wherein the extrudate is dried before it is calcined in step (D).

36. A process of preparing a hydrotreating catalyst comprising at least one Group VI metal or metal oxide, at least one Group VIII metal or metal oxide and halogen which comprises the steps of
(A) preparing a catalyst support by the process which comprises;
(A-1) providing an acidic silica sol;
(A-2) preparing an extrudable mixture comprising the acidic silica sol, alumina and water;
(A-3) extruding the mixture to form an extrudate; and
(A-4) calcining the extrudate at an elevated temperature;
(B) impregnating said support with a solution comprising at least one Group VI metal salt, at least one Group VIII metal salt and a halogen;
(C) drying the impregnated support; and
(D) calcining said dried support.

37. The process of claim 36 wherein the support is impregnated in step (B) with a volume amount of the solution which is about equal to the total pore volume contained in the support.

38. The process of claim 36 wherein the solution in step (B) contains the Group VI and Group VIII metal salts in amounts sufficient to provide a hydrotreating catalyst containing from about 10 to about 35% by weight of combined metal.

39. The process of claim 36 wherein the solution contains sufficient halogen to provide a hydrotreating catalyst containing from about 0.5 to about 10 weight percent of halogen.

40. The process of claim 36 wherein the calcination is effected at a temperature of at least about 400° C. to convert the metals to metal oxides.

41. The hydrotreating catalyst prepared in accordance with the process of claim 36.

* * * * *